United States Patent [19]
Tanuma

[11] Patent Number: 5,928,127
[45] Date of Patent: *Jul. 27, 1999

[54] ALUMINA SOL AND RECORDING SHEET

[75] Inventor: Toshihiro Tanuma, Yokohama, Japan

[73] Assignee: Asahi Glass Company Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/617,732

[22] Filed: Apr. 1, 1996

[30] Foreign Application Priority Data

Apr. 3, 1995 [JP] Japan .................................. 7-077932

[51] Int. Cl.$^6$ ...................................................... C09K 3/00
[52] U.S. Cl. ............................ 516/93; 428/195; 428/329; 106/503
[58] Field of Search ......................... 252/313.1; 428/195, 428/329; 516/93; 106/503

[56] References Cited

U.S. PATENT DOCUMENTS

| | | | |
|---|---|---|---|
| 3,554,907 | 1/1971 | Moore, Jr. | 252/3 |
| 3,812,055 | 5/1974 | Carstens et al. | 252/313.1 |
| 4,676,928 | 6/1987 | Leach et al. | 252/313.1 |
| 4,775,594 | 10/1988 | Desjarlais | 428/421 |
| 4,927,560 | 5/1990 | Osaka et al. | 252/315.1 |
| 5,104,730 | 4/1992 | Misuda et al. | 428/195 |
| 5,139,648 | 8/1992 | Lambert | 208/111 |
| 5,445,868 | 8/1995 | Harasawa et al. | 428/206 |
| 5,519,088 | 5/1996 | Itoh et al. | 524/812 |
| 5,575,885 | 11/1996 | Hirabayashi et al. | 156/626.1 |

FOREIGN PATENT DOCUMENTS

| | | |
|---|---|---|
| 0 614 771 | 9/1994 | European Pat. Off. . |
| 1-171633 | 7/1989 | Japan . |

OTHER PUBLICATIONS

PTO 97–3079, Translation of JP 01171633 A, reference date 19890706 (USPTO Washington, DC, May 1997)
Hawley's Condensed Chemical Dictionary, eleventh edition (Van Nostrand Reinhold Co., NY, NY, copyright 1987) p. 54, Oct. 1989.
Webster's II New Riverside University Dictionary, (Houghton Mifflin Co., Boston, MA, Copyright 1984) p. 101.
Database WPI, Derwent Publication, AN–92–111527, JP–A–04–057895, Feb. 25, 1992.
Patent Abstracts of Japan, vol. 11, No. 150 (C–422), May 15, 1987, JP–A–61–283335, Dec. 13, 1986.
Patent Abstracts of Japan, vol. 13, No. 447 (C–642), Oct. 6, 1989, JP–A–01–171633, Jul. 6, 1989.
Patent Abstracts of Japan, vol. 16, No. 93 (C–0917), Mar. 6, 1992, JP–A–03–275510, Dec. 6, 1991.
Database WPI, Derwent Publications, AN–95–144365, JP–A–07–068920, Mar. 14, 1995.

*Primary Examiner*—Richard D. Lovering
*Assistant Examiner*—Daniel S. Metzmaier
*Attorney, Agent, or Firm*—Oblon, Spivak, McClelland, Maier & Neustadt, P.C.

[57] ABSTRACT

An alumina sol having colloidal particles of alumina hydrate dispersed in an aqueous solvent, said sol containing a compound which has a sulfonic acid group in its molecule and which, when made into a 1 wt % aqueous solution, has a pH of at most 4.

1 Claim, No Drawings

ALUMINA SOL AND RECORDING SHEET

The present invention relates to an alumina sol and a recording sheet prepared from a coating liquid comprising an alumina sol and a binder.

Heretofore, a method for producing an alumina sol has been known which comprises hydrolyzing aluminum isopropoxide and adding an acid to the resulting precipitate for peptization (e.g. B. E. Yoldas, Amer. Ceram. Soc. Bull. 54,289 (1975)). Also a method has been known which comprises adding an acid to an aqueous solution of sodium aluminate to obtain a precipitate of alumina hydrate, which is then heated together with a peptizer in an autoclave for peptization. Here, as a peptizer, an inorganic acid such as hydrochloric acid, nitric acid or sulfuric acid, or an organic acid, for example, a carboxylic acid such as acetic acid, is used. Usually, an alumina sol has the lowest viscosity when the pH is about 3.5. Accordingly, for peptization, an acid is added to bring the pH to such a level.

When such an alumina sol is coated on a substrate, followed by drying, it is possible to form a porous gel layer which has a good absorbing property and is excellent in the transparency. However, when the coating layer becomes thick, cracks are likely to form during drying, and in some cases, it is difficult to form a thick coating. Further, in a case where a volatile acid such as acetic acid is used as the peptizer, there is a problem in the operation or in use of the product, such that it has an irritating odor.

It is an object of the present invention to solve the above-mentioned problems and to obtain an alumina sol which facilitates thick coating and which is excellent in the storage stability and coating properties and capable of suppressing blotting of ink when a sheet coated with the sol is subjected to printing.

The present invention provides an alumina sol having colloidal particles of alumina hydrate dispersed in an aqueous solvent, said sol containing a compound which has a sulfonic acid group in its molecule and which, when made into a 1 wt % aqueous solution, has a pH of at most 4.

Now, the present invention will be described in further detail with reference to the preferred embodiments.

The compound which has a sulfonic acid group in its molecule and which, when made into a 1 wt % aqueous solution, has a pH of at most 4, serves as a peptizer for the alumina sol. Even if a compound has a sulfonic acid group in its molecule, if it shows only a weak acidity like taurine (pH=6.8, when made into a 1 wt % aqueous solution), such a compound has no or little peptizing ability, whereby a stabilized alumina sol can hardly be obtained. The peptizer is required to have a pH of at most 4 when it is dissolved alone in water to form a 1 wt % aqueous solution. This pH is preferably at most 3.

The present invention provides also an alumina sol which contains, in addition to the above alumina sol, a compound having a carboxyl group or a sulfonic acid group and an amino group in the same molecule, or a compound selected from the group consisting of formamide and acetamide. Such an additional compound serves as a so-called viscosity-reducing agent, which reduces the viscosity of the alumina sol.

The present invention further provides a recording sheet having a porous layer, which is obtained by coating and drying a coating liquid prepared by mixing a binder to the above alumina sol.

Specifically, the compound to be used as a peptizer may, for example, be a sulfonic acid of an aromatic hydrocarbon such as benzenesulfonic acid (pH=2.1 when made into a 1 wt % aqueous solution; the pH shown in a bracket after each of the following compound names is the pH of a 1 wt % aqueous solution in each case), p-toluenesulfonic acid (pH=2.3), ethylbenzenesulfonic acid (pH=2.3) or dodecylbenzenesulfonic acid (pH=2.8), or a sulfonic acid of an aliphatic hydrocarbon, such as hexanesulfonic acid (pH=1.8). The hydrocarbon may have a substituent other than the sulfonic acid group, and 2-acrylamide-2-methylpropanesulfonic acid (pH=1.6) can also suitably be used. Amidosulfuric acid ($H_2N—SO_3H$, pH=2.0) can also suitably be used. These compounds will hereinafter be generally referred to simply as sulfonic acids. The sulfonic acids may be used in combination as a mixture of two or more of them.

The sulfonic acid is used usually in an amount of from 1 to 50 mmol per mol of aluminum atoms of the alumina hydrate. If the amount of the sulfonic acid is less than 1 mmol, peptization will not adequately proceed, such being undesirable. On the other hand, if it exceeds 50 mmol, cracking is likely to result when the sol is coated on a substrate, especially in the case of thick coating, and it is necessary to pay an attention to the corrosiveness during the coating step, which is disadvantageous from the viewpoint of the operational efficiency. A preferred range of the sulfonic acid to be used is from 1 to 100 mmol per mol of aluminum atoms of the alumina hydrate. Specifically, in the case of p-toluenesulfonic acid, a preferred range is from 2 to 40 mmol, and in the case of 2-acrylamide-2-methylpropanesulfonic acid, it is from 1 to 30 mmol. In the case of amidosulfuric acid, a preferred range is from 2 to 30 mmol.

The sulfonic acid serves as a peptizer for alumina hydrate, whereby it is possible to obtain an alumina sol having a high solid content. The solid content of the sol is preferably at most 30 wt % from the viewpoint of the stability. A sol having a concentration lower than 30 wt % can be prepared without any problem. However, the solid content is preferably at least 10 wt %, so that the solvent is not contained unnecessarily too much. Especially when used as a material for a coating liquid to be used for forming an alumina hydrate layer on a substrate, the solid content of the sol is preferably from 15 to 30 wt %. If the solid content is less than 15 wt %, cracking is likely to result during the coating operation, such being undesirable. If the solid content exceeds 30 wt %, the sol tends to be unstable and is susceptible to gelation, whereby the coating property tends to be poor, such being undesirable. A particularly preferred solid content is from 15 to 25 wt % in the case of p-toluenesulfonic acid, and from 20 to 30 wt % in the case of 2-acrylamide-2-methylpropanesulfonic acid. In the case of amidosulfuric acid, a particularly preferred solid content is from 20 to 30 wt %.

In the present invention, as the acid to be added for peptization, the sulfonic acid may be used alone, or another acid may be mixed therewith for peptization. For example, in a case where acetic acid is mixed therewith, a decrease of the pH of the sol can be suppressed, since acetic acid is a weak acid as compared with the sulfonic acid. The amount of the acetic acid to be added, is preferably from 0.5 to 8 mol per mol of the sulfonic acid.

The alumina hydrate is the one which may be represented by the formula $Al_2O_3.nH_2O$. Specifically, it may, for example, be crystalline boehmite (n is from 1 to 1.5), aluminum hydroxide (n is 3), or amorphous alumina hydrate (n is about 3). Especially when the alumina hydrate is boehmite, the gel product obtainable by evaporating the solvent from the sol, has a good absorbing property and is excellent in the transparency, whereby it is suitable for application to e.g. an ink-absorbing layer for a recording sheet.

The pH of the alumina sol is preferably within a range of from 2 to 6. If the pH is outside this range, the stability of the sol tends to be impaired, such being undesirable. More preferably, the pH of the alumina sol is within a range of from 3 to 5.

As a method for synthesizing the alumina hydrate, various methods may be employed including a method of hydrolyzing an aluminum alkoxide, and a method for synthesizing it from an inorganic salt of aluminum.

The temperature for peptization is preferably from 80 to 100° C. If the peptization temperature is lower than 80° C., it tends to take a long period of time for peptization, or the peptization tends to be inadequate, such being undesirable. If the peptization temperature exceeds 100° C., the vapor pressure of the solvent becomes high, whereby the operation tends to be difficult. The time for peptization tends to be short as the amount of the acid to be used increases. It is usually from 10 to 72 hours. The peptization is preferably carried out with stirring in order to obtain a homogeneous sol.

In the present invention, it is preferred to incorporate to the sol a compound having a carboxyl group or a sulfonic acid group and an amino group in the same molecule, or a compound selected from the group consisting of formamide and acetamide, since it is thereby possible to lower the viscosity of the sol.

Among compounds which can be used as viscosity-reducing agents, a compound having a carboxyl group and an amino group in the same molecule is preferable. The compound includes, in addition to an amino acid such as glycine or alanine, 4-aminobutanoic acid and 6-aminohexanoic acid. The amount of the compound having a carboxyl group and an amino group in the same molecule is preferably from 1 to 30 mmol per mol of aluminum atoms in the alumina sol.

As a compound having a sulfonic acid group and an amino group in the same molecule, taurine is suitable for use. The amount of the compound having a sulfonic acid group and an amino group in the same molecule is preferably from 5 to 50 mmol per mol of aluminum atoms in the alumina sol. The amount of formamide or acetamide is preferably from 20 to 200 mmol per mol of aluminum atoms in the alumina sol.

By using such a viscosity-reducing agent, it is possible to lower the viscosity of the alumina sol. Conversely, with a sol having the same degree of viscosity, it is possible to obtain a sol having a higher solid content. Specifically, it is possible to increase the solid content of the sol to a level of from 25 to 30 wt %.

A sol having a high solid content is favorable when a thick coating layer is to be formed by one coating operation. Namely, although it may depend also on the coating method, the viscosity of a coating liquid has a certain range which is suitable for a coating operation, and the amount to be coated is also within a certain range. Accordingly, the amount of a coating liquid to be coated by one coating operation is limited, and the higher the solid content of the sol to be used, the thicker the coating film to be formed by a coating operation. Further, the higher the solid content of the sol, the smaller the volume shrinkage upon drying, whereby cracking in the coating film is less likely to result.

Configuration of sol particles may not necessarily be in the form of primary particles and may be in the form of secondary particles. For example, in the case of a boehmite sol, the secondary particle size is preferably at most 300 nm. If the secondary particle size exceeds 300 nm, the transparency when geled, tends to be low, such being undesirable.

The secondary particle size is more preferably at most 200 nm. The secondary particle size can be determined, for example, by utilizing scattering of a laser beam.

When a boehmite sol is to be used for e.g. an ink absorbing layer for a recording sheet, the thickness of crystals of boehmite primary particles in a direction perpendicular to the (010) face is preferably at least 6 nm. If this thickness is less than 6 nm, the sizes of pores formed in a gel layer obtainable by coating the sol on a substrate tend to be small, whereby no adequate absorbing property required for a recording sheet tends to be obtained, such being undesirable. More preferably, this thickness is from 7 to 10 nm. If the thickness exceeds 10 nm, the transparency of the gel layer tends to decrease, and the haze tends to increase, such being undesirable.

The alumina sol of the present invention can be used for various purposes. Particularly, it is useful for the purpose of forming a coating layer of an alumina gel on a substrate. For example, it may be coated and dried on a substrate such as a paper sheet or a plastic film to form a porous layer of an alumina gel, whereby it is possible to obtain a recording sheet suitable for a recording system wherein ink is used in a large amount, such as an ink jet system. As the substrate, other materials such as fabrics may also be used.

When used for a coating liquid for an ink jet printer, an aromatic sulfonic acid is likely to be colored, for example, during drying after coating and is not suitable for use when high quality recording is desired. For such a purpose, 2-acrylamide-2-methylpropanesulfonic acid or amidosulfuric acid is suitable for use as a peptizer for the alumina sol. To form an ink-receiving layer for a recording medium by coating the alumina sol on a substrate, it is preferred to incorporate a binder to the sol. As such a binder, an organic substance such as polyvinyl alcohol or its modified product, starch or its modified product, styrene butadiene rubber (SBR) latex, nitrile butadiene rubber (NBR) latex, hydroxycellulose, or polyvinylpyrrolidone, may, for example, be used. If the amount of the binder is small, the strength of the ink-receiving layer tends to be inadequate. On the other hand, if it is too much, the amount of ink to be absorbed or the amount of a colorant to be supported tends to be low. Accordingly, the amount of the binder is preferably from 5 to 50 wt % of the alumina hydrate.

Now, the present invention will be described in further detail with reference to Examples. However, it should be understood that the present invention is by no means restricted to such specific Examples.

EXAMPLES 1 to 4

Into a glass reactor having a capacity of 2 l (a baffle-equipped separable flat bottom flask, equipped with a stirrer, a thermometer and a condenser), 810 g of deionized water and 676 g of isopropanol were charged and heated to a liquid temperature of 75° C. by a mantle heater. With stirring, 306 g of aluminum isopropoxide was added thereto, and the mixture was hydrolyzed under a stirring speed of 600 rpm at a liquid temperature of from 75 to 80° C. for 20 hours. Then, while adding 400 g of deionized water, isopropanol used as the solvent and isopropanol formed by the hydrolysis were distilled off. As a result, a boehmite slurry having a solid content of 10 wt %, was obtained. At that time, the liquid temperature became 95° C.

Four batches of this slurry were prepared, and a 10 wt % amidosulfuric acid aqueous solution was added to the respective batches so that the amount of amidosulfuric acid per mol of aluminum atoms in the boehmite became as shown in Table 1. Then, the batches were maintained at 95°

C. for 15 hours for peptization. Further, these liquids were concentrated to obtain transparent sols. The solid content, the pH at 25° C. and the viscosities of the respective sols are shown in Table 1. Further, the dried products at 140° C. of these sols were found to be composed of boehmite crystals by powder X-ray diffraction, whereby the crystal thickness in a direction perpendicular to the (010) face of the crystal particles was 8.1 nm.

TABLE 1

| Example No. | Amount (mmol) | Solid content (wt %) | pH | Viscosity (Pa · s) |
|---|---|---|---|---|
| 1 | 5.6 | 23 | 4.5 | 0.100 |
| 2 | 11.2 | 21 | 4.5 | 0.080 |
| 3 | 16.8 | 23 | 5.0 | 0.060 |
| 4 | 22.4 | 22 | 4.8 | 0.050 |

EXAMPLE 5

A sol was prepared in the same manner as in Example 1 except that instead of the amidosulfuric acid, 13.5 g (10.5 mmol per mol of aluminum atoms in the boehmite) of a 20 wt % p-toluenesulfonic acid aqueous solution was added. This sol was subjected to dispersing treatment and then concentrated to obtain a transparent sol having a solid content of 25 wt %. This sol had a pH of 4.7 at 25° C. and a viscosity of 0.120 Pa.s.

EXAMPLE 6

A sol was prepared in the same manner as in Example 1 except that instead of the amidosulfuric acid, 18 g (11.6 mmol per mol of aluminum atoms in the boehmite) of a 20 wt % 2-acrylamide-2-methylpropanesulfonic acid aqueous solution was added. This sol was subjected to dispersing treatment and concentrated to obtain a transparent sol having a solid content of 25 wt %. This sol had a pH of 4.8 at 25° C. and a viscosity of 0.070 Pa.s.

EXAMPLES 7 to 9

Sols were prepared in the same manner as in Example 1 except that instead of the amidosulfuric acid, the compounds as identified in Table 2 were added in an amount of 10 mmol per mol of aluminum atoms in the boehmite. Such sols were subjected to dispersing treatment and concentrated to obtain transparent sols having solid content as identified in Table 2. The pH at 25° C. and the viscosities of these sols are also shown in Table 2.

TABLE 2

| Example No. | Sulfonic acid | Solid content (wt %) | pH | Viscosity (Pa · s) |
|---|---|---|---|---|
| 7 | Benzenesulfonic acid | 26 | 4.5 | 0.040 |
| 8 | Dodecylbenzenesulfonic acid | 24 | 5.0 | 0.090 |
| 9 | Hexanesulfonic acid | 25 | 4.8 | 0.050 |

EXAMPLES 10 to 13

To the slurry of Example 1, 18 g of a 10 wt % amidosulfuric acid aqueous solution was added, and the mixture was maintained at 95° C. for 15 hours for peptization. Further, a 10% aqueous solution of 6-aminohexanoic acid was added so that the amount per mol of aluminum atoms in the boehmite became as identified in Table 3. Then, these liquids were concentrated to obtain transparent sols. The solid content, the pH at 25° C. and the viscosities of these sols are shown in Table 3.

TABLE 3

| Example No. | Amount (mmol) | Solid content (wt %) | pH | Viscosity (Pa · s) |
|---|---|---|---|---|
| 10 | 2.3 | 27 | 5.1 | 0.100 |
| 11 | 4.6 | 28 | 5.1 | 0.050 |
| 12 | 9.2 | 28 | 5.2 | 0.060 |
| 13 | 12.0 | 27 | 5.2 | 0.110 |

EXAMPLES 14 to 19

Transparent alumina sols were prepared in the same manner as in Example 10 except that instead of 6-aminohexanoic acid, the compounds as identified in Table 4 were used in amounts as identified in Table 4 per mol of aluminum atoms in the boehmite. The solid content, the pH at 25° C. and the viscosities of these sols are shown in Table 4.

TABLE 4

| Example No. | | Amount (mmol) | Solid content (wt %) | pH | Viscosity (Pa · s) |
|---|---|---|---|---|---|
| 14 | Glycine | 5 | 27 | 5.0 | 0.080 |
| 15 | Alanine | 5 | 27 | 5.0 | 0.090 |
| 16 | 4-Aminobutanoic acid | 5 | 29 | 5.2 | 0.050 |
| 17 | Taurine | 10 | 27 | 5.0 | 0.080 |
| 18 | Formamide | 100 | 28 | 5.3 | 0.080 |
| 19 | Acetamide | 100 | 28 | 5.3 | 0.100 |

EXAMPLE 20

A sol having a solid content of 18 wt % was prepared in the same manner as in the preceding Examples except that 9 g of acetic acid was used as a peptizer. This sol had a pH of 4.7 at 25° C. and a viscosity of 0.070 Pa.s. This sol was further concentrated to a solid content of 20 wt %, whereby it became unstable and geled.

Preparation of recording sheets

To 100 g of each of the alumina sols of Examples 1 to 20, a 10 wt % aqueous solution of polyvinyl alcohol (124H, manufactured by Kuraray Co., Ltd.) was added in an amount of 12 wt % to the boehmite, based on the solid concentration, to obtain a coating liquid. This coating liquid was coated on a transparent polyethylene terephthalate film having a thickness of 100 μm by a bar coater so that the film thickness after drying would be 25 μm, and then dried. After drying, the coated film was inspected, whereby a transparent uniform coating film free from cracking was obtained in the case wherein each of alumina sols of Examples 1 to 19 was used. With the one prepared by using the alumina sol of Example 20, fine cracks were observed which are believed to have formed during drying. The recording sheets prepared by using the alumina sols of Examples 1 to 19 were odorless, while the recording sheet prepared by using the alumina sol of Example 20 had an odor of acetic acid to some extent.

Printing evaluation

A test pattern of a color (cyan, yellow, magenta or black) was printed by an ink jet printer using ink containing a water-soluble dye. After printing, the sheet was left to stand at room temperature for one week, whereby no blotting of ink was observed.

The alumina sol of the present invention is stable even when the solid content is high and thus provides an alumina sol having a high concentration as compared with conventional alumina sols. When the alumina sol of the present invention is coated and dried on a substrate, it is possible to obtain a porous gel layer having a good absorbing property and being excellent in the transparency. The alumina sol of the present invention is excellent in the storage stability and the coating stability and is free from formation of cracks during drying, whereby a thick coating can readily be attained. Further, no such operational problem as an irritating odor is present, and this sol has an excellent characteristic that when printing is made on a sheet having this sol coated thereon, no blotting of ink is observed on the sheet.

What is claimed is:

1. An alumina sol having colloidal particles of alumina hydrate dispersed in an aqueous solvent prepared by peptizing an aluminum hydrate slurry to form a peptized sol with amidosulfuric acid the amidosulfuric acid having the property that a 1 wt. % aqueous solution of the compound dissolved alone in water has a pH of at most 4, thereafter concentrating the peptized sol to form the alumina sol, which contains as a viscosity lowering agent a compound having both a carboxyl group and an amino group or both a sulfonic acid group and an amino group in the same molecule, the alumina sol having a solid content of from 15 to 30 wt. % and a pH of 2 to 6.

* * * * *